United States Patent [19]

Saleil et al.

[11] 4,066,442

[45] Jan. 3, 1978

[54] METHOD OF MAKING CHROME STEEL IN AN ELECTRIC ARC FURNACE

[76] Inventors: Jean Saleil, 11, rue Lougansk, 42100, Saint-Etienne; Maurice Debras; Jean-Yves Malefant, both of 41, rue Emile Zola, 42240, Unieux, all of France

[21] Appl. No.: 762,945

[22] Filed: Jan. 27, 1977

[30] Foreign Application Priority Data

Feb. 4, 1976 France .................................. 76.03077

[51] Int. Cl.$^2$ ............................ C21C 5/52; C21C 5/32
[52] U.S. Cl. ............................................. 75/12; 75/59; 75/60; 75/130.5
[58] Field of Search ..................... 75/12, 60, 59, 130.5

[56] References Cited

U.S. PATENT DOCUMENTS

| 3,708,599 | 1/1973 | Krause | 75/12 |
| 3,860,418 | 1/1975 | Josefsson | 75/60 |
| 3,867,135 | 2/1975 | Johnsson | 75/60 |
| 3,867,136 | 2/1975 | Eriksson | 75/60 |
| 3,902,889 | 9/1975 | Malin | 75/12 |

*Primary Examiner*—P. D. Rosenberg
*Attorney, Agent, or Firm*—Haseltine, Lake & Waters

[57] ABSTRACT

In a method of making chrome steel in an electric arc furnace, a charge of chrome-bearing molten metal in the furnace is decarburized by blowing into the charge a jet of pure oxygen and water vapor through a double lance consisting of two concentric tubes and extending into the furnace through a wall or the roof of the furnace, the end of the lance being submerged in the charge and surrounded by a medium which protects it against high temperature wear.

7 Claims, No Drawings

METHOD OF MAKING CHROME STEEL IN AN ELECTRIC ARC FURNACE

The present invention is concerned with the manufacture of chrome steels in electric arc furnaces, and is more particularly but not exclusively concerned with the manufacture of stainless steels.

It is known that chromium-containing molten steel can only be decarburized without significant loss of chromium in the slag if one of the following procedures is adopted:

a. decarburization is carried out at high temperatures, or
b. decarburization is carried out with a reduced partial pressure of carbon monoxide.

As the carbon content of the melt decreases and the chromium content increases, this high temperature must be progressively increased, or the partial pressure of carbon monoxide reduced.

The use of high temperatures in electric refining furnaces is a widespread common practice, but it has its disadvantages which include rapid consumption of the refractory materials of the furnace and a reduction in the amount of time that the furnace can be used because of the frequency with which repairs have to be carried out.

It is also well known to use a reduced partial pressure of carbon monoxide, and this has generally been achieved in one of two ways:

a. by decarburizing the molten metal in vacuo by blowing in oxygen, or
b. by blowing in oxygen diluted with a neutral gas such as argon, or with a fluid, such as, for example, water vapor which is dissociated by the heat of the furnace to give off a gas, hydrogen in the case of water vapor, which dilutes the carbon monoxide.

As compared with a neutral gas, the water vapor or atomized water has the advantage that it not only dilutes the carbon monoxide, but also enables the temperature of the molten metal to be controlled accurately, by virtue of the endothermic dissociation of a controllable flow of vapor.

Water vapor has been used in the manufacture of chrome steels in steel converters fitted with tuyeres arranged in the bases of the converters.

Also, the applicants have a French Pat. No. 73.04266 which is concerned with making chrome steels in an electric furnace with at least one submerged jet passing through the walls or the base of the furnace, this jet blowing oxidizing gas into the molten metal, below the surface thereof, and passing upwardly into the mass of molten metal. In the cited example, these jets consist of tuyeres which are protected against wear by an agent such as fuel oil.

The present invention is intended to make available to steelmakers using electric furnaces, who do not have any converters and who do not wish to incorporate tuyeres into the base plates or side walls of their furnaces, the advantages of using water vapor.

According to the present invention there is provided a method of making chrome steel in an electric furnace, the method including the steps of introducing a double lance consisting of two concentric tubes into said furnace through an opening in the wall of said furnace or through the roof of said furnace, and decarburizing a charge of chrome-bearing molten metal in said furnace by submerging the end of said lance in said molten charge and by blowing pure oxygen and water vapor through said lance in a jet into said molten charge, the end of said lance being surrounded by a medium which protects it against high-temperature wear.

The water vapor serves as an oxidizing agent, complementing the action of the pure oxygen, as a diluting agent for the carbon monoxide, as a thermal control agent, and even as an anti-wear agent.

The water vapor may be totally or partially replaced with water, preferably atomized.

When the carbon content of the molten metal is below a certain value at which scorification of the chromium becomes serious, the oxidizing gas blown into the molten metal advantageously consists of a mixture of oxygen and a fluid for diluting the carbon monoxide which results from decarburization of the molten metal, suitable fluids including argon, nitrogen, water vapor, and atomized water in a carrier gas.

In a preferred embodiment of the present invention, the carbon content of the molten metal changes during the main part of the refining operation from an initial value of from 1.2 to 3% to a final value of from 0.2 to 0.6%, and then refining to lower values of carbon content take place in vacuo, after decanting the molten metal into a ladle, with the introduction of oxygen and agitation by means of a neutral gas.

In a preferred embodiment of the present invention, from a certain value of the carbon content, between 0.1 and 0.3%, blowing in of pure oxygen is discontinued, and, with the molten metal still in the electric furnace, water vapor alone is blown in through the same lance. If very low carbon contents are required, this water vapor is blown in mixed with a neutral gas, which may be argon.

Preferably, the peripheral part of the jet always includes a high proportion of water vapor (greater than 80%), which is introduced through the gap between the two tubes of the lance, and which may constitute the whole of the flow in the outer region of the jet, the inner tube of the lance carrying a mixture of pure oxygen and water vapor, the relative amount of the former decreasing and that of the latter increasing as the carbon content of the molten metal decreases.

Preferably, the proportion of water vapor in the blown mixture and the amount of cooling additives are continuously regulated so that the temperature of the molten metal is maintained between 1650° C and 1720° C when the carbon level is below 1%.

It will be realized that the major advantage of the use of the above described method is that it provides the benefits of using water vapor in the making of chrome steel without requiring the steelmaker to invest in bottom-blown converters or to modify existing electric furnaces by implanting tuyeres. This means, of course, that one loses the benefits of bottom-blowing, as described in French patent No. 73-04266, but the advantages of using water vapor are retained, and water vapor is a cheap fluid.

Strict temperature regulation, provided by the use of water vapor, means that 18% chromium can be included in the charge, all stages in the refining being carried out in the electric arc furnace, and with the addition of very little over-refined ferrochromium, which is expensive.

The metal is dehydrogenized in the known way, by terminating the blowing of the molten metal by blowing a neutral gas through the lance.

The invention will be more fully understood from the following description of an example of a metallurgical process in accordance with the invention, given by way of example only.

36 Tons of a mixture of carburized ferro-chromium, ferro-nickel and scrap iron were loaded into an electric furnace with a nominal load of 35 tons. After the melting process, the composition of the molten metal at 1550° C included 18% chromium, 2.2% carbon, and 0.4% silicon.

A lance was introduced through a hatch in the furnace and through it were blown the amounts of pure oxygen and water vapor set out in the following table.

| Stage No. | Duration min | Flow of $O_2$ Nm³/min | Flow of $O_2$ % | Flow of water vapor Nm³/min | Flow of water vapor % | Total consumption from start of blowing (Nm³) $O_2$ | Total consumption from start of blowing (Nm³) water vapor |
|---|---|---|---|---|---|---|---|
| 1 | 10 | 18 | 78.3 | 5 | 21.7 | 180 | 50 |
| 2 | 30 | 15 | 60 | 10 | 40 | 630 | 350 |
| 3 | 6 | 10 | 35.7 | 18 | 64.3 | 690 | 458 |

From a carbon level of 2.2% down to 1% the temperature rose progressively from 1550° C to 1700° C. From 1% carbon to the end of the blowing process the temperature was kept between 1680° C and 1710° C.

At the end of the blowing, with the temperature at 1710° C, analysis of the molten metal gave a figure of 0.28% for the carbon and 17.2% for the chromium.

Conditions at this time are favorable for either of the following procedures:

a. decanting of the metal into a ladle, for further treatment in vacuo involving the blowing in of pure oxygen using a lance, for the purpose of achieving very low carbon levels, or b. continuing the refining process in the electric furnace using the same lance, but blowing in water vapor only, and at a rate of 37 Nm³ per minute (30 kg/min) for about 27 minutes, so that about 800 kg of water vapor are blown in. The temperature of the molten metal remains in the region of 1700° C.

At the end of this final stage of blowing, analysis gives a figure of 0.024% for the carbon content and 14.3% for the chromium.

The chromium oxides in the slag are reduced by the addition of ferro-silicon and the slag is then raked out.

200 Nm³ of argon are then blown in through the lance, in order to dehydrogenize the molten metal. The metal is then run off into a ladle.

It will be understood that details of the above described method may be modified and improved, and that equivalent means may be employed, without departing from the scope of the invention as defined by the appendant claims.

What is claimed is:

1. A method of making chromium steel by decarburizing a charge of chromium-bearing molten metal in an electric furnace, the method including the steps of:
   a. introducing a double lance consisting of two concentric tubes into said furnace through an opening in the wall of said furnace or in the roof of said furnace,
   b. submerging the tip of said lance in said molten charge,
   c. blowing pure oxygen and water vapor through said lance in a jet into said molten charge, so that the peripheral part of said jet includes more than 80% of the water vapor which is blown in through the gap between said two tubes of said lance to protect the tip of said lance against high-temperature wear, the inner tube of said lance carrying a blown mixture of pure oxygen and water vapor,
   d. decreasing the relative amount of the pure oxygen and increasing that of the water vapor as the carbon content of said molten metal decreases,
   e. when the carbon level in said molten metal is below 1%, regulating continuously the proportion of water vapor in said blown mixture and the amount of cooling additives so that the temperature of said molten metal is maintained between 1650° C. and 1720° C.

2. The method according to claim 1, wherein from a carbon content of said molten charge of between 0.1 and 0.3% water vapor alone is blown through said double lance.

3. The method according to claim 1, wherein water vapor alone is blown in through said gap between said two tubes of the lance.

4. The method according to claim 2, wherein for very low carbon levels the blown in water vapor is mixed with a neutral gas.

5. The method according to claim 4, wherein said neutral gas is argon.

6. The method according to claim 1, wherein the water vapor is wholly or partially replaced with water.

7. The method according to claim 6, wherein the water is atomized.